(12) United States Patent
Menno

(10) Patent No.: US 8,857,488 B2
(45) Date of Patent: Oct. 14, 2014

(54) PIPE FITTING INSTALLATION DEVICE

(71) Applicant: Chris Menno, West Palm Beach, FL (US)

(72) Inventor: Chris Menno, West Palm Beach, FL (US)

(73) Assignee: HDPE Solutions, LLC, West Palm Beach, FL (US)

( * ) Notice: Subject to any disclaimer, the term of this patent is extended or adjusted under 35 U.S.C. 154(b) by 0 days.

(21) Appl. No.: 13/667,733

(22) Filed: Nov. 2, 2012

(65) Prior Publication Data

US 2013/0234429 A1    Sep. 12, 2013

Related U.S. Application Data

(60) Provisional application No. 61/555,403, filed on Nov. 3, 2011.

(51) Int. Cl.
| | |
|---|---|
| *B29C 65/02* | (2006.01) |
| *B32B 37/06* | (2006.01) |
| *B32B 43/00* | (2006.01) |
| *B25B 5/04* | (2006.01) |
| *B23K 37/053* | (2006.01) |
| *F16L 47/30* | (2006.01) |
| *F16L 47/03* | (2006.01) |

(52) U.S. Cl.
CPC ......... *F16L 47/03* (2013.01); *F16L 47/30* (2013.01)
USPC ............................. 156/391; 156/538; 269/238

(58) Field of Classification Search
CPC .... B29C 65/18; B29C 65/20; B29C 65/2076; B29C 65/7802; B29C 65/7841; B29C 66/43; B29C 66/52241; B23K 9/04; B21C 37/08; B65H 37/0005; F16L 23/026; F16L 41/08; F16L 47/00; G11B 23/40
USPC ................. 156/293, 296, 391, 392, 499, 538; 269/237–239
See application file for complete search history.

(56) References Cited

U.S. PATENT DOCUMENTS

| | | | | |
|---|---|---|---|---|
| 1,952,605 | A | * | 3/1934 | Pearson .................... 269/228 |
| 3,966,528 | A | * | 6/1976 | Christie .................... 156/293 |
| 4,533,424 | A | | 8/1985 | McElroy |
| 5,206,980 | A | * | 5/1993 | Chapman ................... 29/237 |
| 5,904,377 | A | | 5/1999 | Throup |
| 5,988,199 | A | | 11/1999 | Ryan et al. |
| 6,446,662 | B1 | | 9/2002 | Wagner |

* cited by examiner

*Primary Examiner* — Sing P Chan
(74) *Attorney, Agent, or Firm* — McHale & Slavin, P.A.

(57) ABSTRACT

A portable assembly for securing a plastic fitting to a plastic pipe by employing fusion or thermal sealing is disclosed. The assembly is secured to the outer circumference of a plastic pipe at a desired location. The assembly can be secured at any longitudinal and lateral position along a plastic pipe. A heater heats both the pipe and the fitting to the point where they begin to melt. The heater is then removed and the fitting is pressed onto the surface of the pipe, thus fusing the fitting to the pipe. After cooling, the assembly is removed and the surface of the pipe within the interior of the fitting is drilled or removed. This now enables fluid within the pipe to be sent to the fitting and onto distribution lines which are connected to the fitting.

19 Claims, 15 Drawing Sheets

US 8,857,488 B2

PIPE FITTING INSTALLATION DEVICE

REFERENCE TO RELATED APPLICATION

In accordance with 37 C.F.R 1.76, a claim of priority is included in an Application Data Sheet filed concurrently herewith. Accordingly, the present invention claims priority under 35 U.S.C. §119(e) to U.S. Provisional Application 61/555,403 entitled "PIPE FITTING INSTALLATION DEVICE" filed on Nov. 3, 2011. The contents of each of the above referenced applications are herein incorporated by reference in its entirety.

FIELD OF THE INVENTION

The present invention relates to a device for the installation of fittings on plastic pipes. In particular, the present invention is a portable device which can be secured to pipes of various outside diameters and secure a pipe fitting, such as a treaded fitting, to the pipe by thermal welding. The pipe is then cut or punctured within the pipe fitting to permit access from the interior of the pipe to the pipe fitting.

BACKGROUND OF THE INVENTION

It is known in the art to join two plastic pipes together by heating the facing butt ends of each pipe to a selected temperature until they become molten and then pressing the two ends together. This will make a joint that is as strong as the original pipe. It is also known that a selected force should be applied to form the perfect joint. This thermal technique can also be used to secure plastic fittings to the side walls of plastic pipes. Employing this technique, the fitting can be placed onto the pipe and its exact location and position determined prior to the fitting being secured to the pipe. This "trial and error" type of placement of a fitting on a pipe eliminates any judgment errors on behalf of the individual installing the fitting.

DESCRIPTION OF THE PRIOR ART

U.S. Pat. No. 4,533,424 discloses a portable pipe fusion apparatus for attaching plastic side wall fittings, e.g. tees and branch saddles to a plastic pipe of selected composition. This apparatus comprises a base plate with means to rigidly clamp the base plate to a pipe main. Two parallel, spaced support rods attached to the base plate at one end and to a support plate across the other two ends. A movable clamp is guided to slide along the support rods with the axis of movement intersecting the axis of the pipe main. The movable clamp can be attached to and hold various side wall fittings rigidly, so that the axes of the fittings intersect the axis of the main pipe. A drive screw, held in a quick release split nut means on the support plate, will force the movable clamp in the direction to contact the transverse pipe main. A hydraulic load cell is interposed between the drive screw and the movable clamp with an indicator which continually reads the force being applied between the moving clamp and the pipe main.

U.S. Pat. No. 5,988,199 discloses a fitting for coupling a service line to a polyethylene fluid distribution pipe, such as a water main or a gas main. The fitting includes a stub length of polyethylene pipe that serves as a base for attaching a corporation stop valve. The cross section of the open base end is machined to match the curvature of the outside surface of the main pipe and then fused into the sidewall of the main. The corporation stop valve can then be used for hot tapping polyethylene mains.

U.S. Pat. No. 5,904,377 discloses a pipe fitting adapted to be installed in an aperture in a wall of a fluid container. The fitting comprises inner and outer co-axial sleeve members interconnected for relative axial movement and a split, helically wound, washer. The inner sleeve member has an end portion insertable through the aperture, and the outer sleeve member has an annular bearing surface adjacent to the end portion adapted to overlie a first one of two opposed surfaces of the wall around the periphery of the aperture. The split washer is retained to and extends around the end portion opposite the bearing surface and is of larger outer diameter than the aperture, but is insertable therethrough by winding so as to overlie the second of the opposed surfaces of the wall. The washer is compressible into annular engagement with the second surface of the wall by relative axial movement of the inner and outer sleeve members such that the wall around the aperture is gripped between the washer and the bearing surface, thereby sealing the connection between the fitting and the wall. The fitting may be installed in an aperture of a pipe, which may be lined.

U.S. Pat. No. 6,446,662 discloses a device which comprises a combination hand cylinder drill and tool for installing a stopper plug for drilling and/or plugging a hole in a sealed fluid container. The stopper plug aspect is used to insert and secure a stopper plug to close a hole in the wall of a storage container or a pipe carrying fluid under pressure. This permits removal of a defective pipe fitting such as a tee or a valve. The stopper plug includes a toggle or anchor for engaging the inner wall of the pipe at the location of the hole to be sealed shut. After the stopper plug is secured in place, the defective fitting is removed. The drill aspect of the invention is used to drill out a cylindrical hole in the pipe and/or fitting so that the plug can be installed.

SUMMARY OF THE INVENTION

A portable assembly for securing a plastic fitting to a plastic pipe by employing fusion or thermal sealing is disclosed. The assembly is secured to the outer circumference of a plastic pipe at a desired location. The assembly can be secured at any longitudinal and lateral position along a plastic pipe. A heater heats both the pipe and the fitting to the point where they begin to melt. The heater is removed and the fitting is pressed onto the surface of the pipe, thus fusing the fitting to the pipe. After cooling, the assembly is removed and the surface of the pipe within the interior of the fitting is drilled or removed. This now enables fluid within the pipe to be sent to the fitting and onto distribution lines which are connected to the fitting.

Accordingly, it is an objective of the present invention to provide an assembly which utilizes a thermal device for securement of relatively small plastic fittings to the sidewall of a larger plastic pipe.

It is a further objective of the present invention to provide an assembly which can simultaneously heat a plastic pipe and a fitting which is to be secured to the pipe.

It is yet another objective of the present invention to provide an assembly which enables accurate placement of a fitting on a pipe.

It is a still further objective of the present invention to provide a portable assembly for securing a fitting to a pipe which is readily adjustable both longitudinally and laterally along a pipe.

Other objects and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

DETAILED DESCRIPTION OF THE INVENTION

Figure 1:
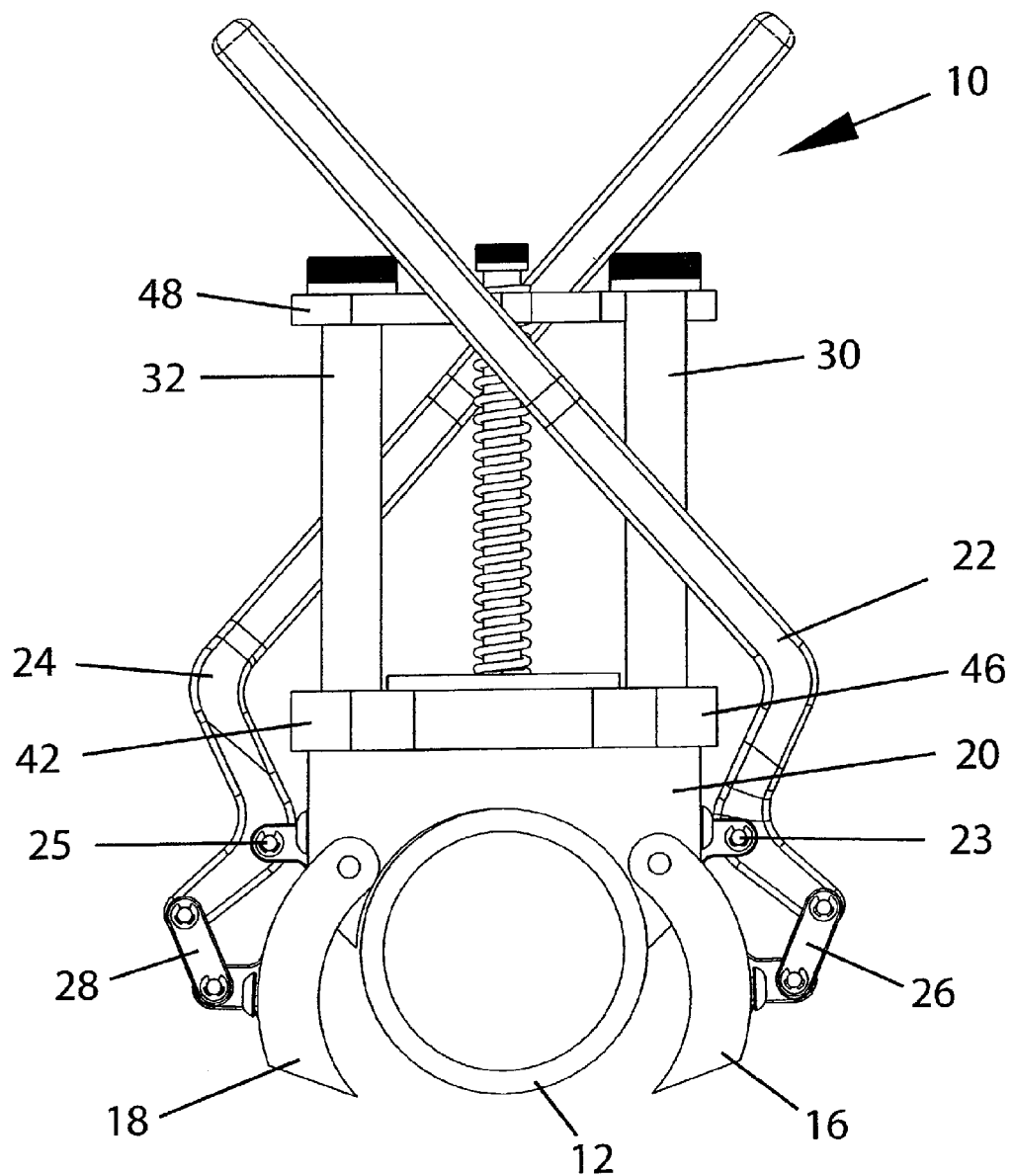
FIG. 1 is a front view of the present invention prior to being secured to a pipe.

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

Figure 2:
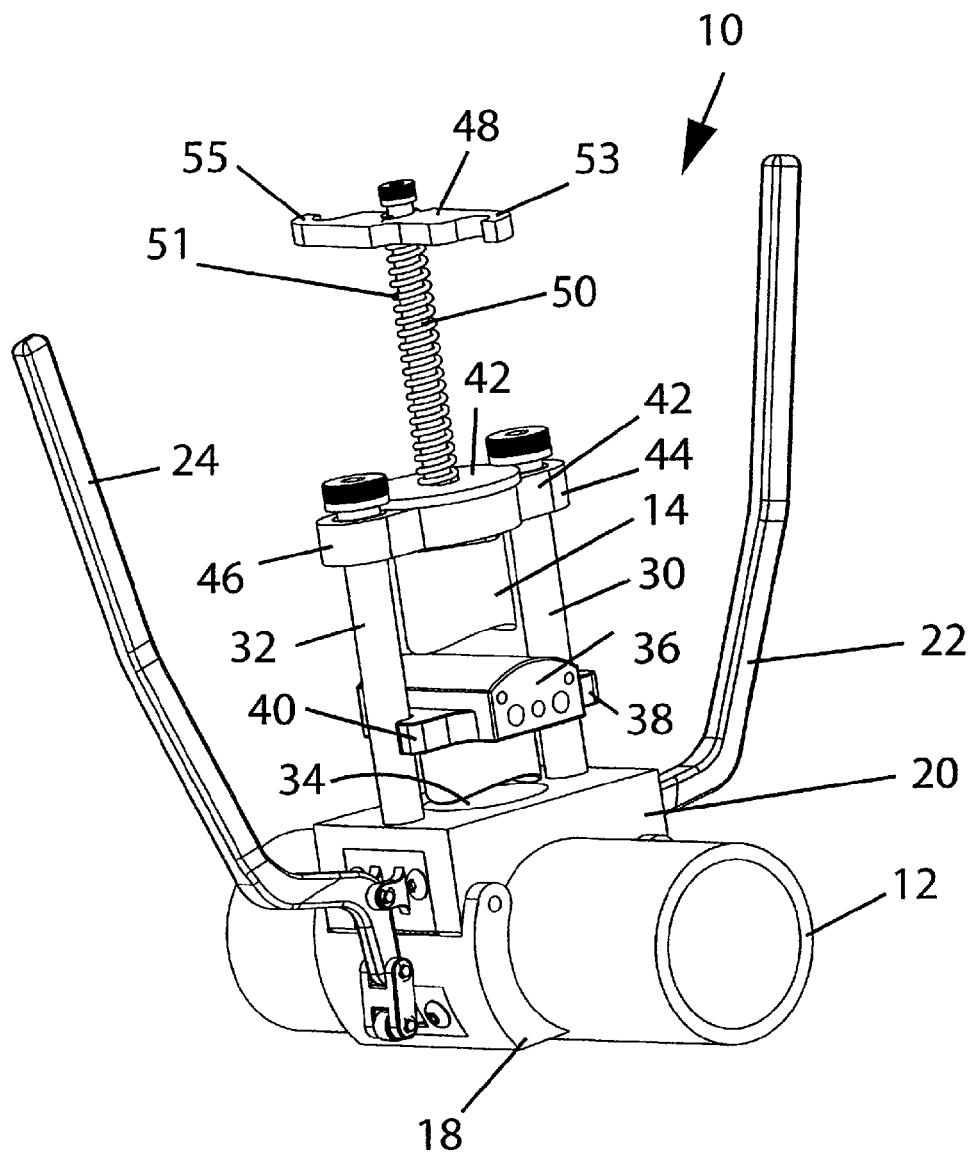
FIG. 2 is a perspective view of the present invention after being secured to a pipe.
Figure 3:
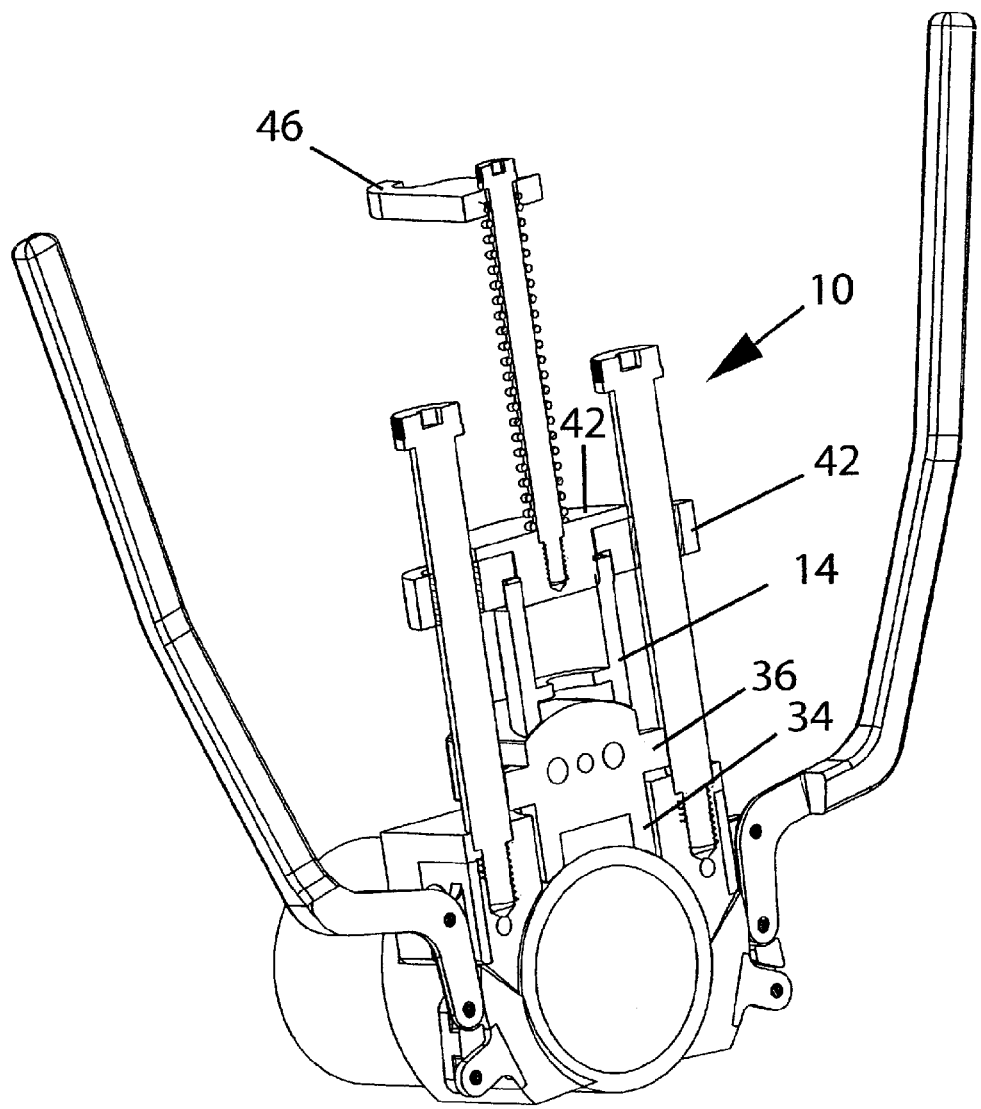
FIG. 3 is a cross sectional view of the present invention as illustrated in FIG. 2.
Figure 4:
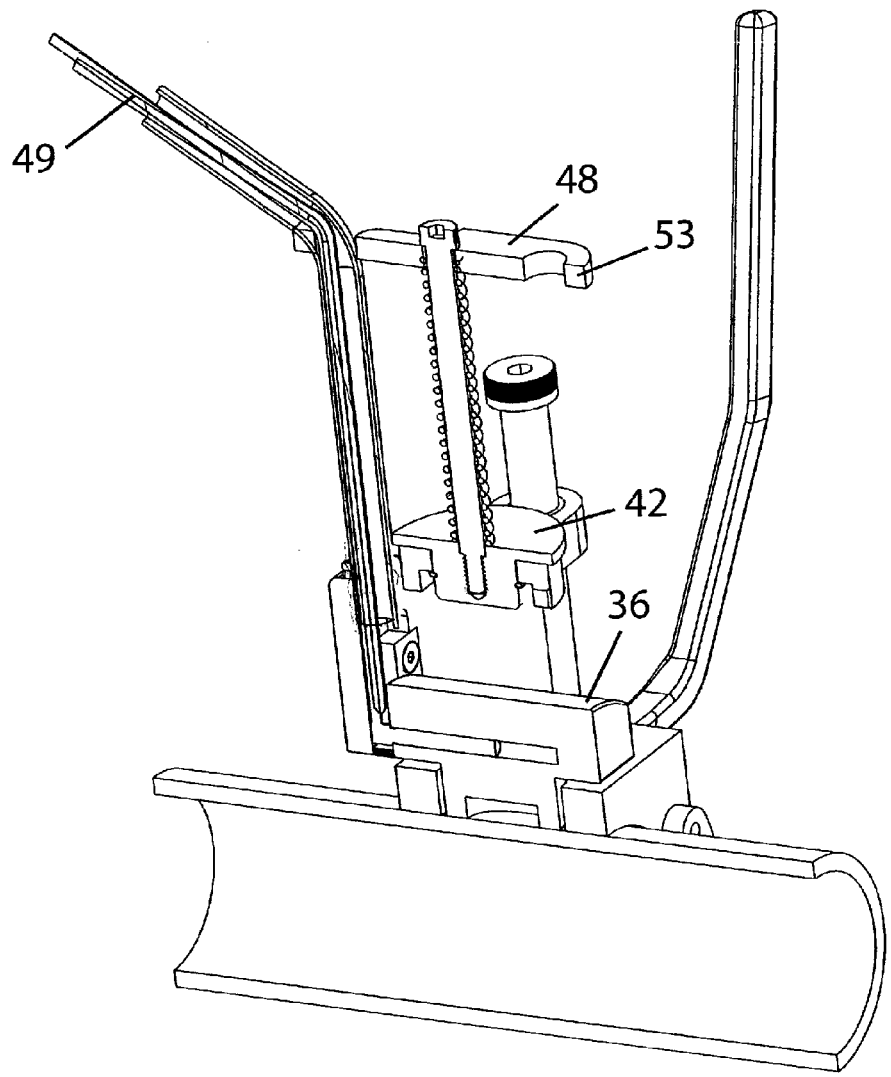
FIG. 4 is a cross sectional view taken along a longitudinal axis of the pipe of the present invention as illustrated in FIG. 2.
Figure 5:
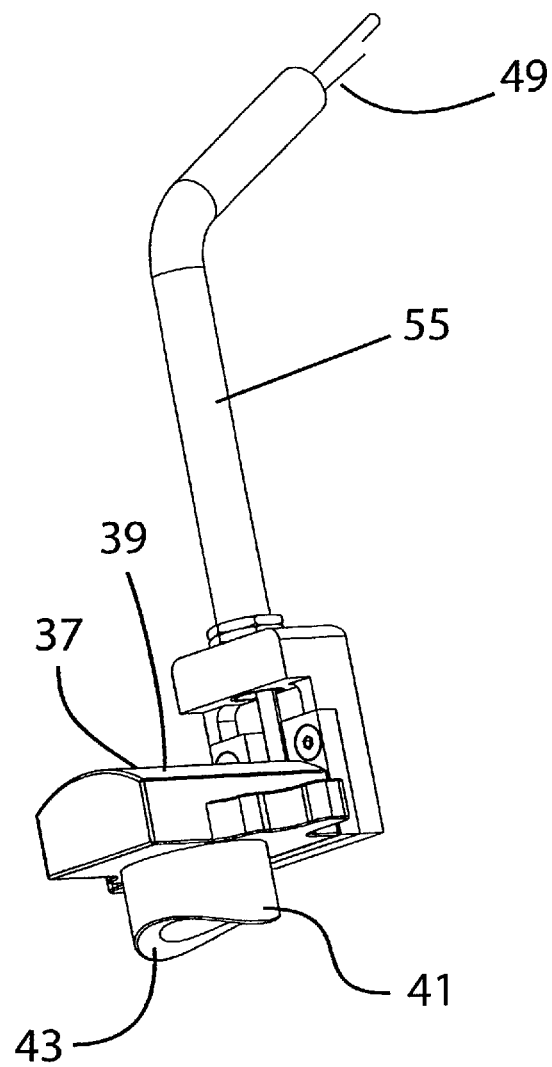
FIG. 5 is a perspective view of the heater of the present invention.
Figure 6:
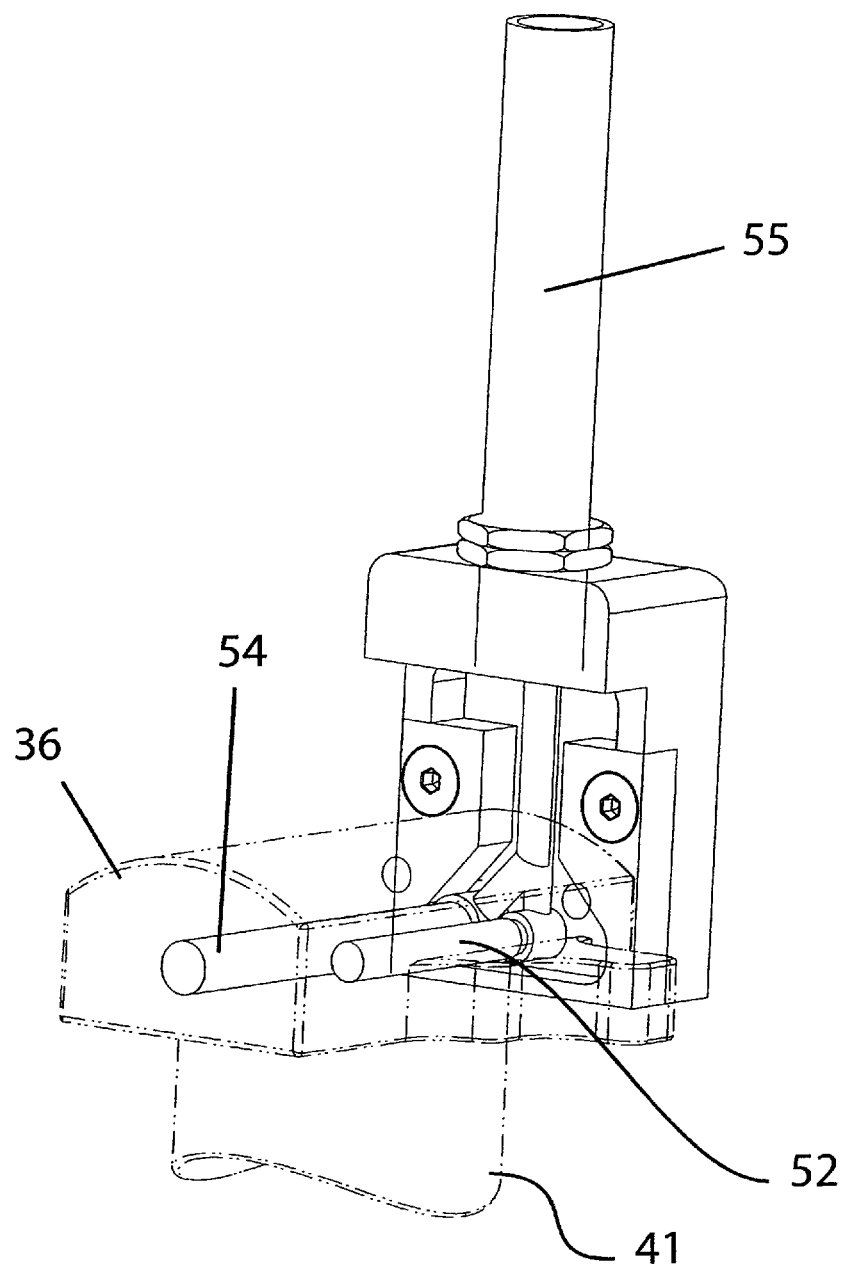
FIG. 6 is a detailed view of the heater with the housing shown in phantom.
Figure 7:
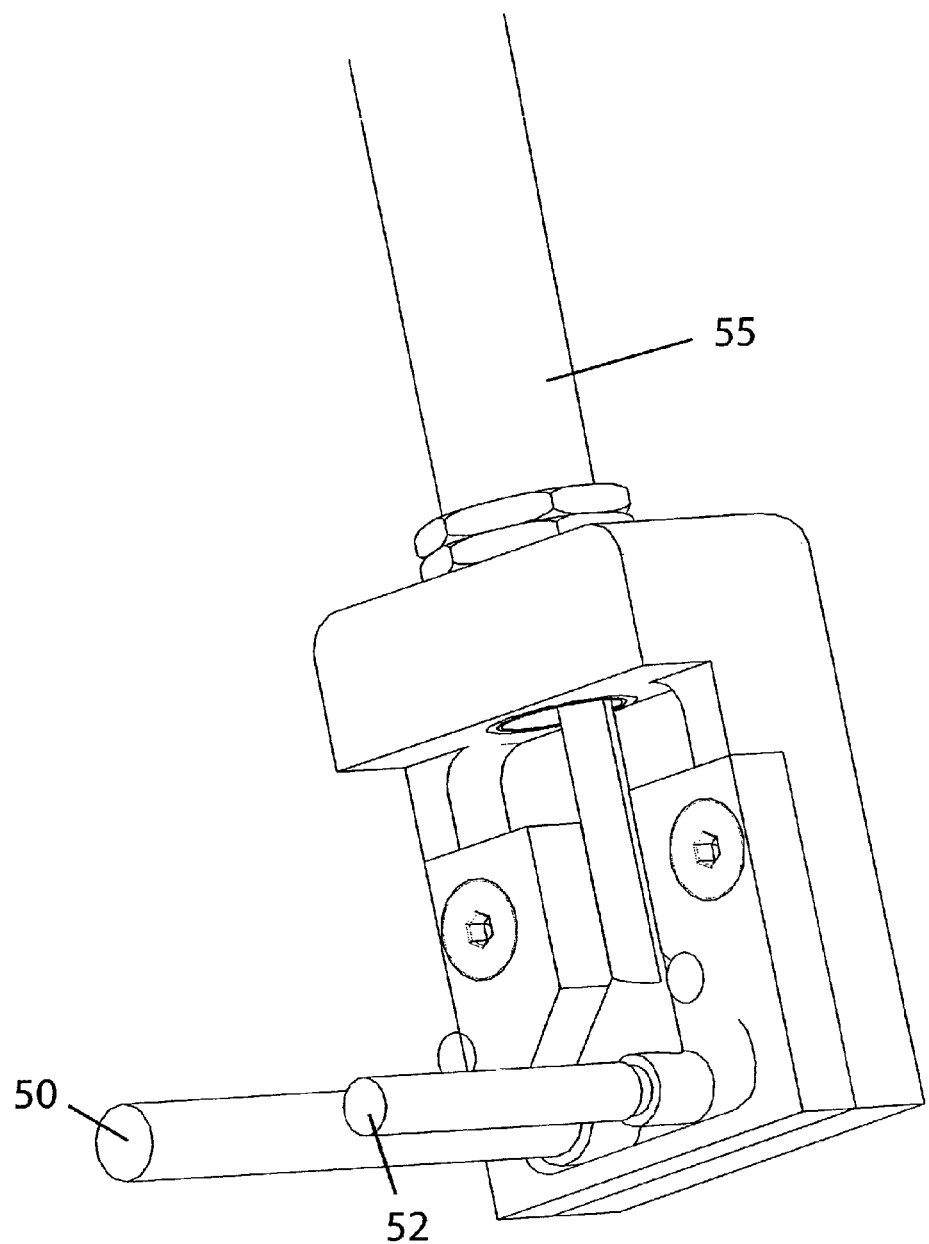
FIG. 7 is a perspective view of the heating elements of the heater.

FIGS. 1-7, which are now referenced, illustrate the present invention and the manner in which it is assembled. A preferred embodiment of the present invention is illustrated generally as 10. The present invention is constructed and arranged to be secured to a pipe 12 which is hollow and is designed to transport fluids. As can be seen in FIGS. 2 and 3, the present invention circumscribes almost the entire outer circumference of a portion of pipe 12 when it is in its operational position. In this operational position, the present invention is designed to be secured to a pipe so that it will not move in any direction, with respect to the pipe, while a fitting 14 is being secured to the pipe 12. Attachment to a pipe 12 also provides for re-rounding the outer surface of the pipe to establish a proper radius for fusing.

The present invention includes a plurality of jaws 16 and 18 which are pivotally secured to the main body 20 of the present invention (FIGS. 1 and 2). The jaws are preferably arranged to provide over center engagement with pipe 12 so that capture of the pipe 12 to the device 10 can be accomplished from the top of the pipe without the need for additional parts. As can be seen in FIG. 2, the lower portion of the main body 20 is arc shaped so that the lower portion will snugly engage a portion of pipe 12. A plurality of movable lever arms 22 and 24, preferably attached to the main body 20 at opposing ends, are pivotally secured to the main body 20 at 23 and 25 and cantilevered to the jaws 16 and 18. These cantilever connections 26 and 28 between the arms 22 and 24 and the jaws 16 and 18 enable the jaws 16, and 18 to be securely positioned on and secured to the pipe 12. This arrangement further provides for self locking, preferably through the use of an over center lever system or toggle locking action mechanism. The jaws 16 and 18 and the main body 20 tightly secure the present invention to the outer circumference of a pipe 12. The arc shape of the lower portion of the main body 20 and the jaws 16 and 18 enable the present invention to be placed on a pipe, secure a fitting to the pipe and then be moved along the longitudinal axis of the pipe 12 so that another fitting can be secured to the pipe 12.

Additionally, the present invention can be rotated around the circumference of the pipe so that one or more fittings can be secured to the pipe 12 at almost any location on the outer surface of the pipe. This feature is especially useful when the pipe 12 is in its final location, for example a water irrigation main feed line, and new sprinklers or drip lines need to be secured to the irrigation main feed line. In this situation, only a portion of the main feed line needs to be uncovered and the present invention is secured to the main feed line. The fitting or drip line(s) are then secured to the main feed line and the pipe is reburied. This eliminates a very costly removal of all or most of the main feed line to secure new fittings, etc. to the main feed line.

The main body 20 of the present invention includes at least two upright rods 30 and 32 secured to the top of the main body 20, see FIGS. 1 and 2. The main body 20 also includes an aperture 34 which extends from the upper surface of the main body completely through to the bottom of the main body, as seen in FIGS. 2 and 3. The preferred shape of the aperture 34 is circular. However, any other shape can also be utilized. The shape of aperture 34 corresponds to the exterior shape of the fitting 14 which is being secured to the pipe 12.

A heater 36, see FIGS. 2-6, is secured to the rods and 32 in a manner which enables the heater 36 to be slidingly raised and lowered along the length of the rods. This interconnection between the heater 36 and the rods 30 and 32 is enabled by tabs 38 and 40 on the heater 36. Tabs 38 and 40 partially engage the circumference of each rod 30 and 32 so that the heater 36 is aligned with the aperture 34. This enables the heater 36 to be inserted into and raised out of the aperture 34. The partial engagement of the tabs on the rods enable the heater 36 to be removed from the rods 30 and 32 without having to be raised to the ends of the rods. This interaction can be seen in FIG. 2. The heater 36 has been raised out of aperture 34 and can then be moved toward the right of the drawing and away from rods 30 and 32.

The fitting 14 in a preferred embodiment of the present invention is a plastic fitting, such as a fusion transition saddle, which is secured to the outer surface or circumference of a main pipe 12. Fluid distribution lines (not shown) are then attached to the fitting 14. Preferably, the interior of fitting 14 includes threads which enable the distribution lines to be threadably connected to the fitting 14. The fitting 14 is removably secured to a holder 42. Preferably, the fitting 14 is shaped so that it can only fit into the holder 42 in a position which will enable the fitting to be properly secured to pipe 12. This relationship between the fitting 14 and the holder 42 avoids incorrect placement of the fitting on the pipe 12 when the apparatus is used in the field. This also enables operators with limited knowledge of the present invention to properly operate the invention.

Holder 42 is secured to a swing latch 48 by a shaft 50 with a spring 51. Swing latch 48 engages rods 30 and 32, as illustrated in FIG. 1, and when the shaft 50 is turned, the holder 42 is either raised from or lowered toward the main body 20. The holder 42 is slidingly secured to rods 30 and 32. The holder 42 includes ends 44 and 46 which are provided with apertures. Rods 30 and 32 pass through these apertures and enable the holder 42 to be raised from and lowered toward the main body 20.

FIGS. 2 and 3 illustrate the process by which the fitting 14 is secured to the pipe 12. The entire assembly 10 is first placed onto pipe 12 at a desired location, FIG. 1. Next, the assembly 10 is secured to the pipe by clamps 16 and 18. Then, the holder 42 is placed in its utmost position, see FIG. 2, and the fitting 14 is placed therein. The heater 36 is then placed on the rods 30 and 32 beneath the fitting 14. The heater 36, at this stage, is outside of the aperture 34 of the main body 20. Next, the fitting 14 is lowered into contact with the top of the heater 36 by applying a force to the swing latch 48 which compresses the spring 51, and both the heater 36 and fitting 14 are lowered into the aperture 34. The swing latch 48 is designed to swing or rotate so that the hooked portions 53 and 55 are coupleable and locked to a portion of the upright rods 30 and 32. The lower portion of the heater 36 is brought into contact with the outer surface of pipe 12. Next, an electric current is sent to the heater, through wires 49 within handle 51, see FIGS. 4-7, which in turn raises the temperature of the heating elements 52 and 54. The higher temperature of the heating elements 5 and 54 is transferred to the heater housing 37. The heater housing 37 is now in contact with the lower end of fitting 14 through the upper surface 39 (first heating surface) and the outer surface of pipe 12 through lower heating element 41 (forming a second heating surface). The lower heating element 41 is designed to contain a surface 43 that is the same as or substantially similar to the surface of the pipe fitting that is to be fused with the pipe 12. The temperature of the heater is now sufficiently high to melt both the lower end of the fitting 14 and the outer surface of pipe 12. Next, the heater 36 and fitting 14 are raised up and away from the pipe 12 and out of aperture 34. The heater 36 is then removed from the assembly and the fitting 14 is lowered onto the surface of pipe 12 through aperture 34. A force is applied to the swing latch 48 to compress the spring 51. As the force is applied, the swing latch 48 is pushed in a downward direction, pushing on fitting 14. The swing latch 48 swings or rotates so that the hooked portions 53 and 55 are coupleable and locked to a portion of the upright rods 30 and 32. The area of the pipe 12 which has been heated and heated end of fitting 14 are at a temperature at which the material from which they are made melts. The fitting is placed onto the pipe, and both the fitting and the pipe melt or fuse together to form a fluid tight seal between them.

Next, the holder 42 is raised by unhooking the swing latch 48 and allowing the spring 51 to return to its original form. The assembly 10 is then removed from the pipe 12. Finally, the outer surface of pipe 12 which is within the interior of fitting 14 is drilled out or removed so that fluid can flow between the pipe 12 and fitting 14.

Figure 8:
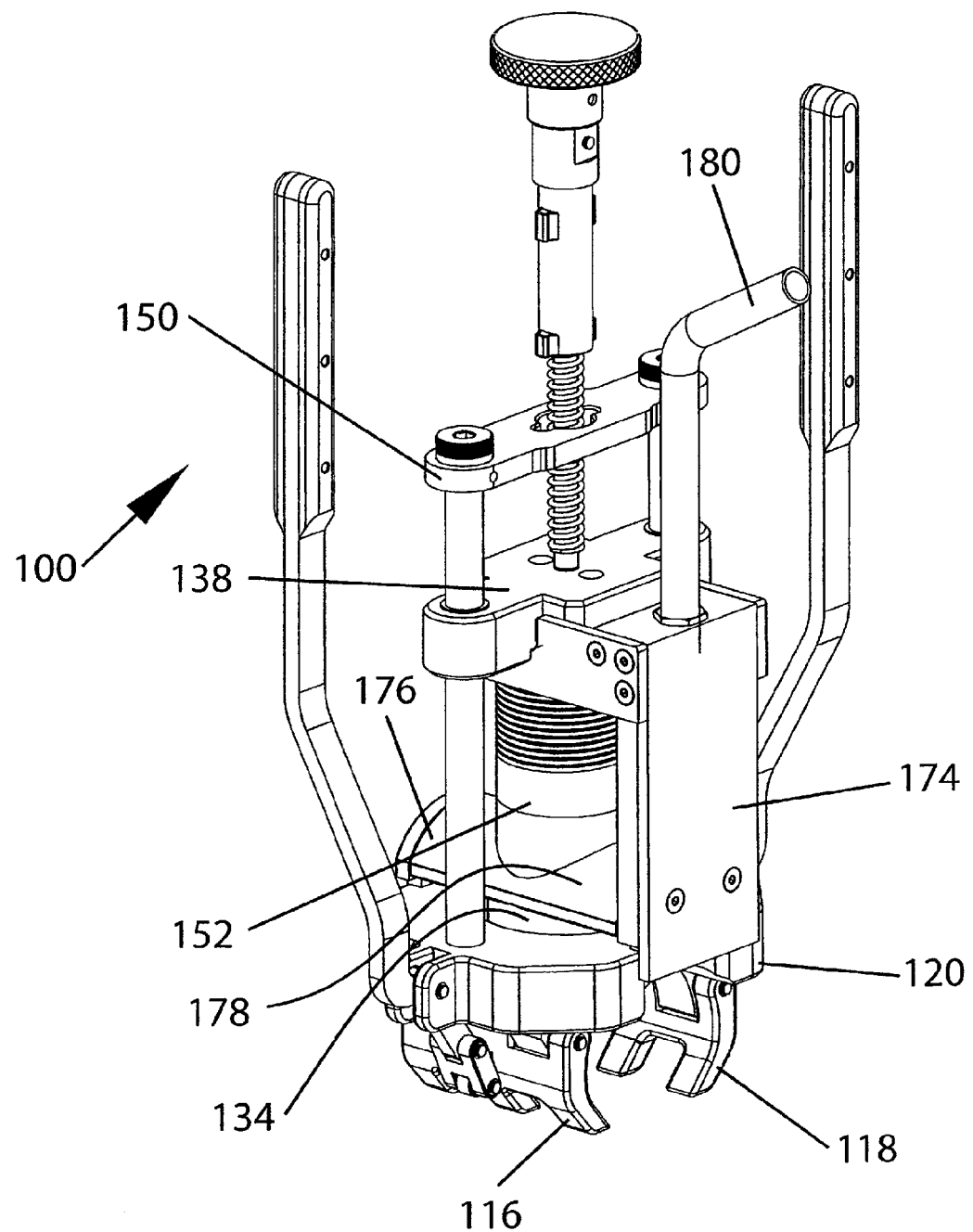
FIG. 8 is a rear perspective view of an alternative embodiment of the present invention.
Figure 11:
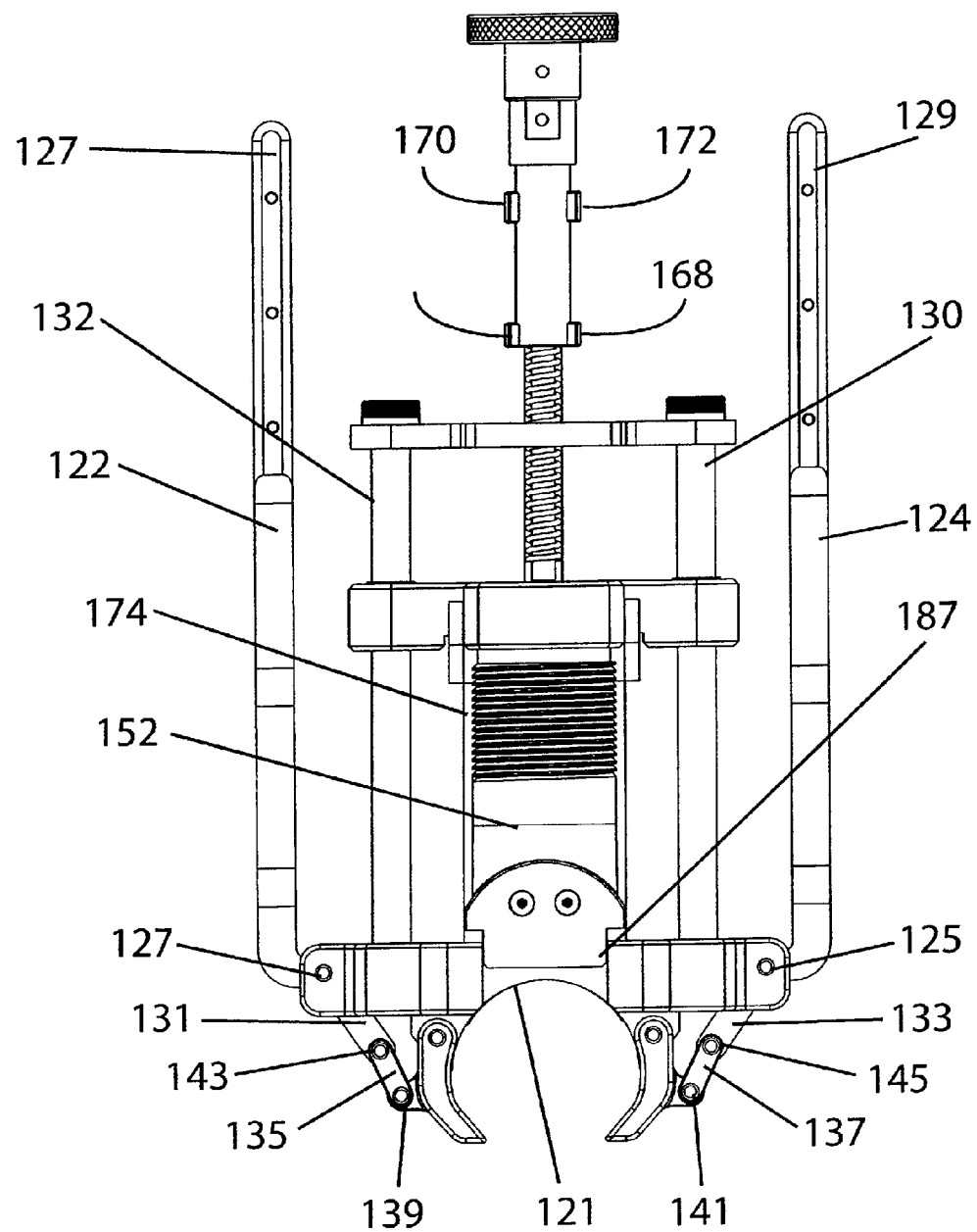
FIG. 11 is a front plane view of the pipe fitting installation device illustrated in FIG. 8.
Figure 12:
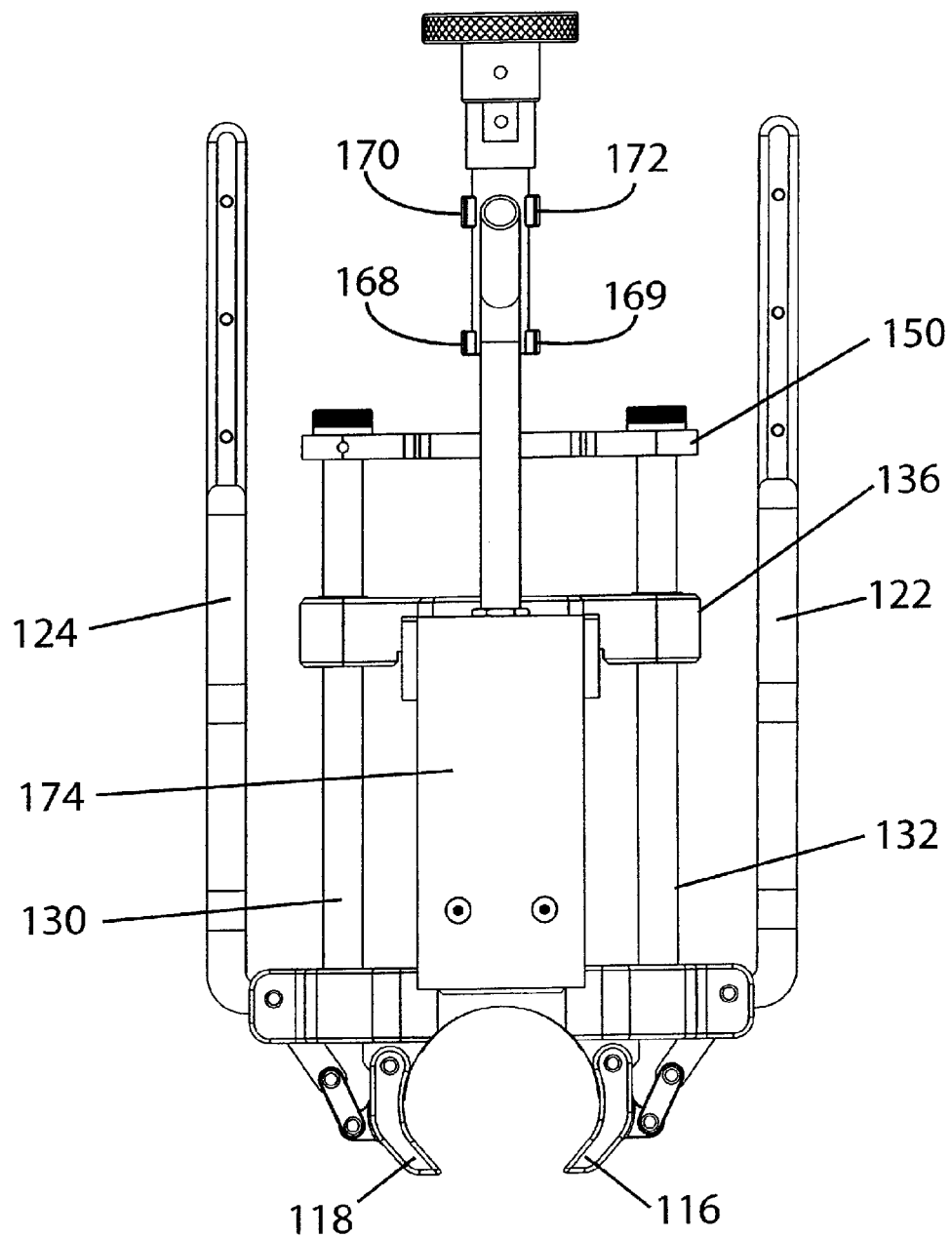
FIG. 12 is a rear plane view of the pipe fitting installation device illustrated in FIG. 8.
Figure 13:
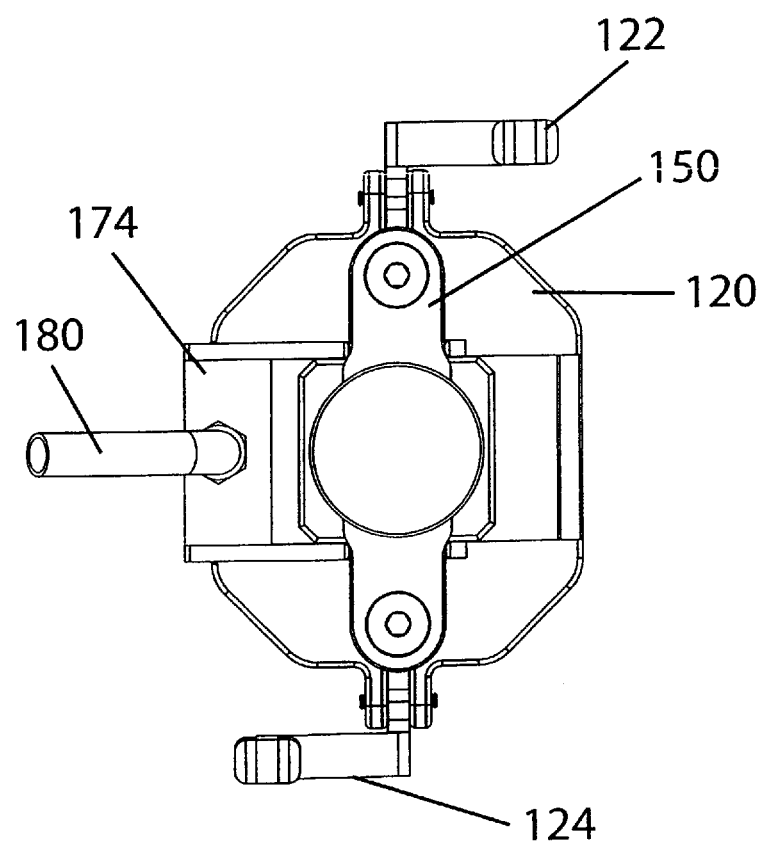
FIG. 13 is a top view of the pipe fitting installation device illustrated in FIG. 8.

FIGS. 8-14 illustrates an alternative embodiment of the pipe fitting installation device. The embodiment illustrated in these figures contains many of the same features described previously. Referring to FIG. 8, the device for securing a fitting to a pipe, generally referred to as 100, is designed to provide a quick and easy method of coupling a fusible transition saddle to an existing pipe. Accordingly, the device 100 is designed to secure to a pipe 112, see FIG. 9C through a clamping mechanism using a plurality of jaws 116 and 118. The jaws 116 and 118 are operatively coupled to the main fuser body 120 so that they are traversable between a first position, i.e. an open position, and a second closed position i.e. enclosed and secured to the outer surface of a pipe inserted between the two jaws 116 and 118. Preferably, the jaws 116 and 118 are positioned so as to provide over center connection to the pipe without the need for additional structures. The main fuser body 120 is sized and shaped to provide support, particularly when coupled to the pipe. A lower portion 121 of the main body 120, see FIG. 11, is arc shaped so as to snugly engage a portion of the pipe. Preferably, the length of the arch is sized to correspond to the length of the arch shaped perimeter of the attached pipe. To provide for the actual securing of the jaws 116 and 118 to the pipe, a plurality of movable lever arms 122 and 124 are pivotally secured to the main fuser body 120 using for example pins 123 and 125, see FIGS. 11 and 12. Preferably, the lever arms are coupled to the main fuser body 120 at opposing ends. Each arm 122 and 124 contains a proximal end 127 and 129, and a distal end 131 and 133. The distal ends 131 and 133 are coupled to the jaws 116 and 118 through linkers or toggles 135 and 137 which are pivotally connected to the jaws through connectors, such as a pin 139 and 141. The linking plates or toggles 135 and 137 are pivotally coupled to the distal end 131 and 133 through pins 143 and 145, thus forming a clamp with toggle locking action. As shown FIGS. 11 and 12, the jaws 116 and 118 are in the closed position so that the linking or toggle plates are over center, therefore providing a self locking mechanism. This self locking mechanism allows for the device 100 to securely clamp to a pipe without the need for any external securing knobs or other adjustment requirements. The jaws 116 and 118 and the main fuser body 120, therefore, tightly secure the present invention to the outer circumference of a pipe 12. To "unlock" the device, the lever arms 122 and 124 are pulled in an opposite direction, thereby releasing the over the center formation. Although not illustrated in FIGS. 8-14, FIG. 1 illustrates the device in the unlocked or non-engaged position.

Figure 9A:
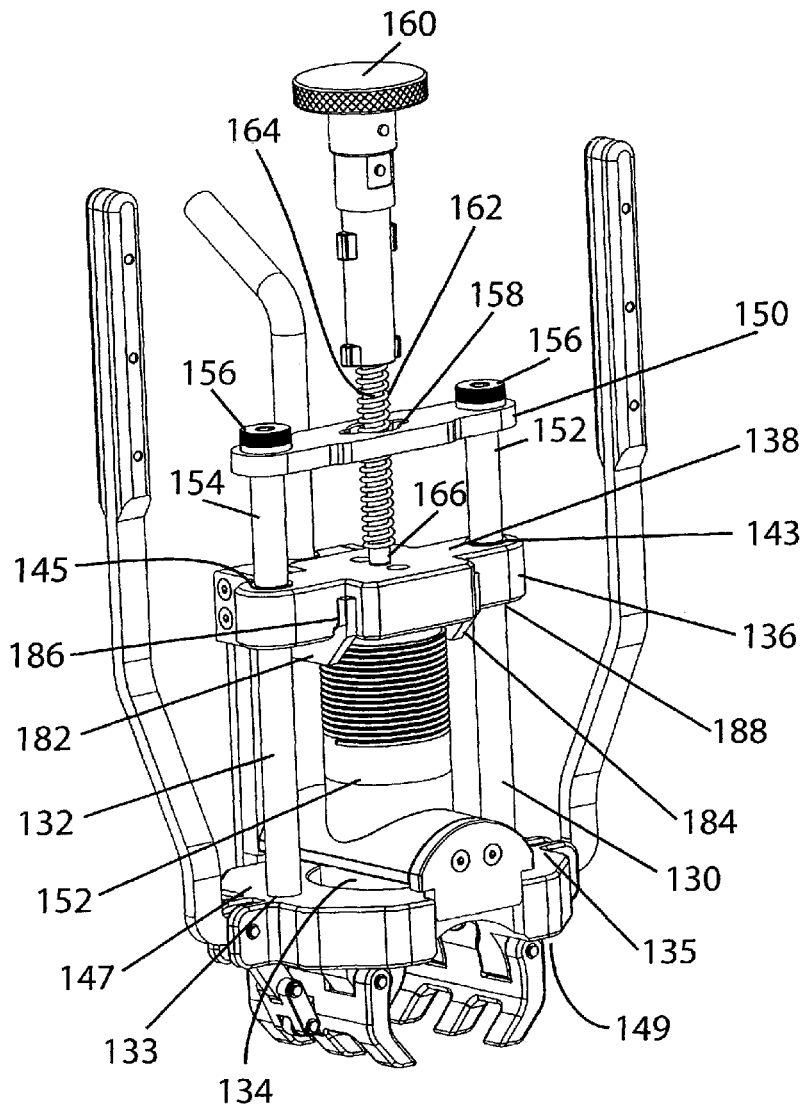
FIG. 9A is a front perspective view of the pipe fitting installation device illustrated in FIG. 8.
Figure 9B:
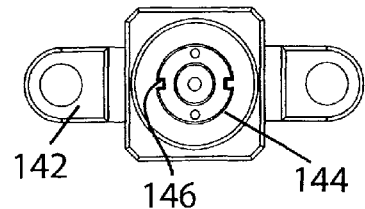
FIG. 9B is a plane view of the bottom side of the fitting holder.
Figure 9C:
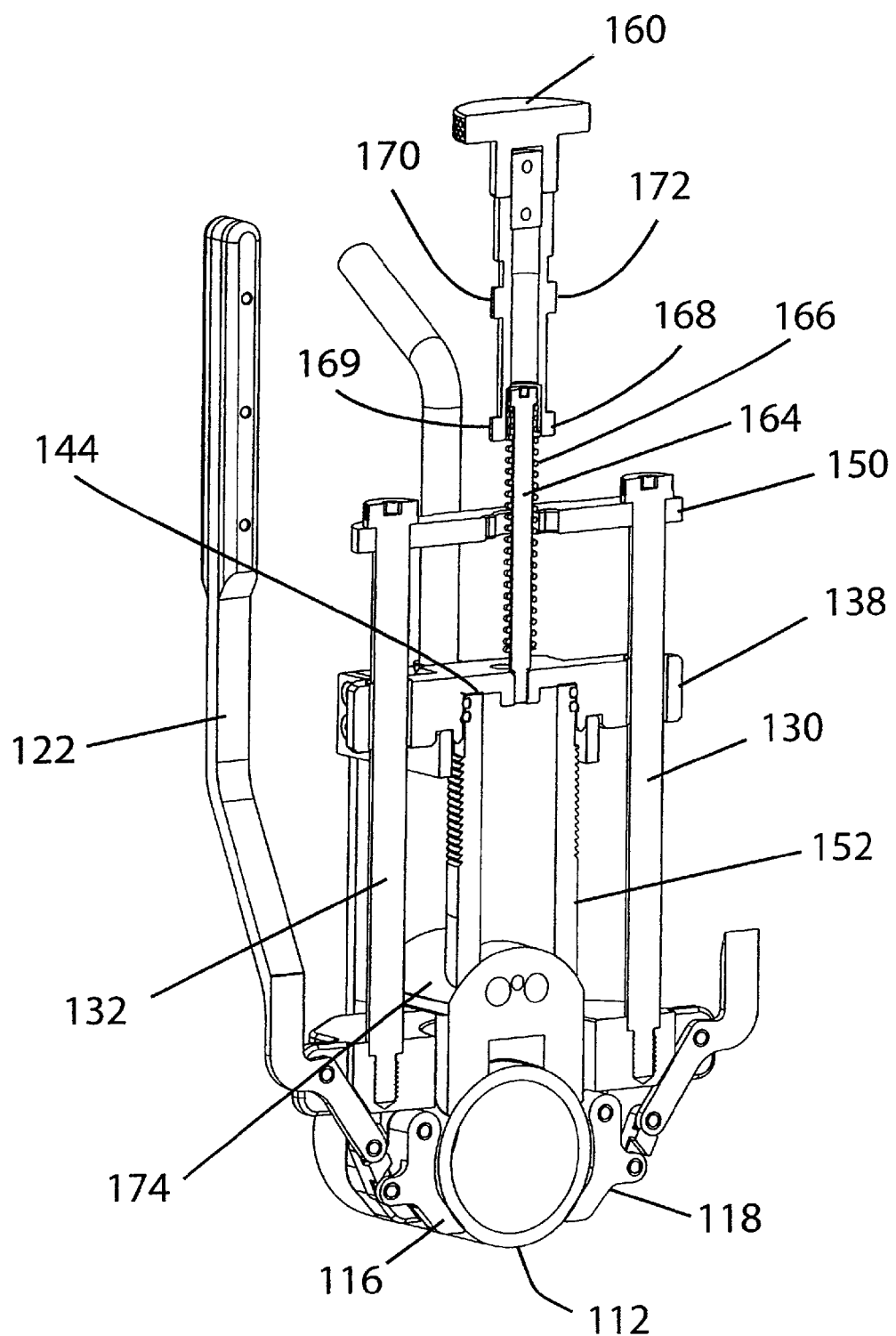
FIG. 9C is a cross sectional view of the present invention as illustrated in FIG. 8.
Figure 10:
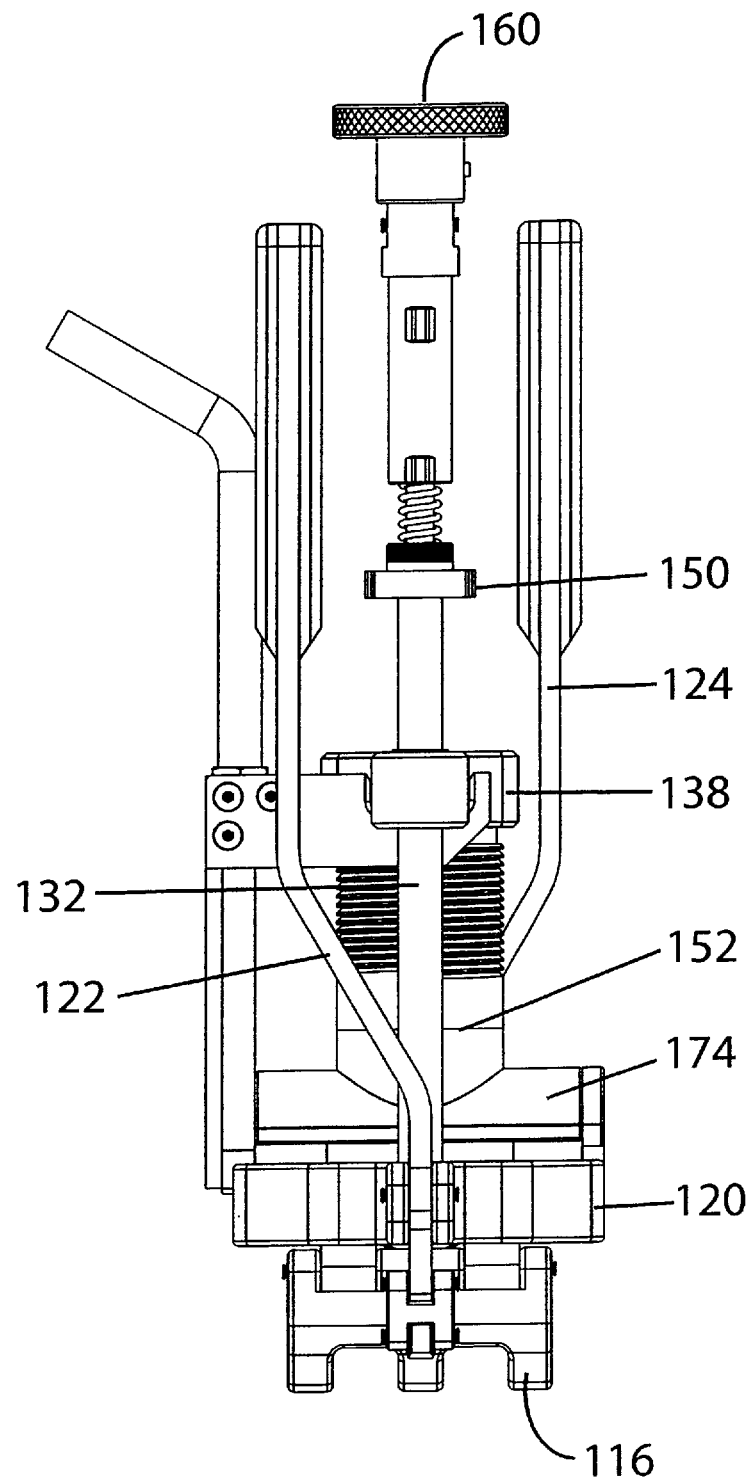
FIG. 10 is a side view of the pipe fitting installation device illustrated in FIG. 8.
Figure 14:
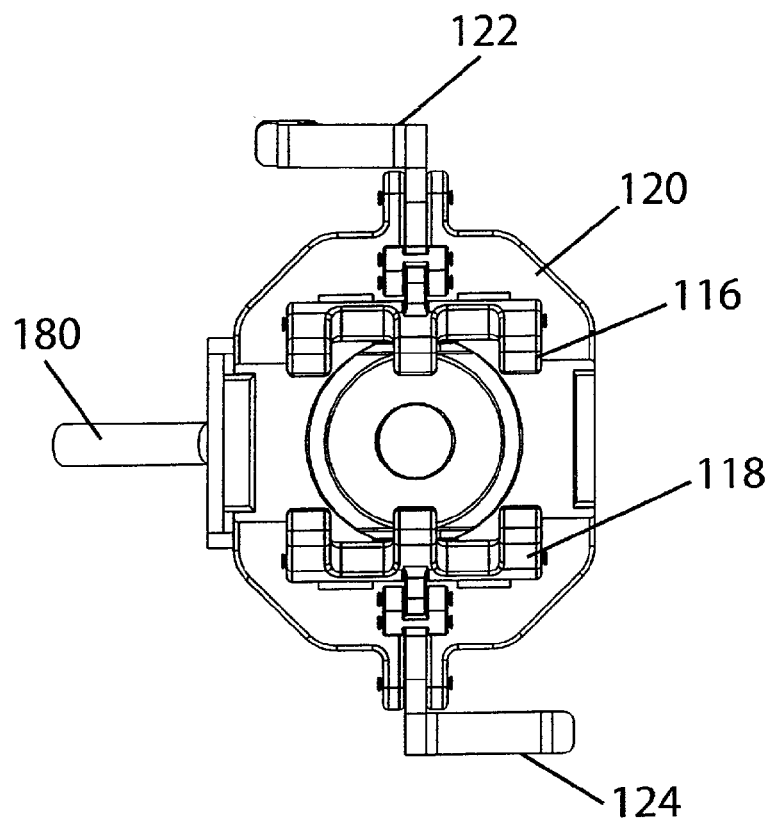
FIG. 14 is a bottom view of the pipe fitting installation device illustrated in FIG. 8.

The main fuser body 120 of the present invention includes at least two upright rods 130 and 132 secured to the top of the main body at terminal ends 133 and 135, see for example FIG. 9. The main body 120 also includes an aperture 134 which extends from the upper surface 147 of the main fuser body 120 completely through to the bottom 149 of the main body, as seen in FIGS. 9 and 14. The preferred shape of the aperture 134 is circular. However, any other shape can also be utilized. The shape of aperture 134 preferably corresponds to the exterior shape of the fitting which is being secured to the pipe. A pipe fitting holder 136 contains a top end 138 and a bottom end 142, see FIG. 9B. A plurality of openings 143 and 145 are sized and shaped to receive the rods 130 and 132. Preferably, the fitting holder 136 slidably engages the rods 130 and 132 through the openings 143 and 145, allowing for vertical movement in the direction of the longitudinal axis of the rods.

Figure 15:
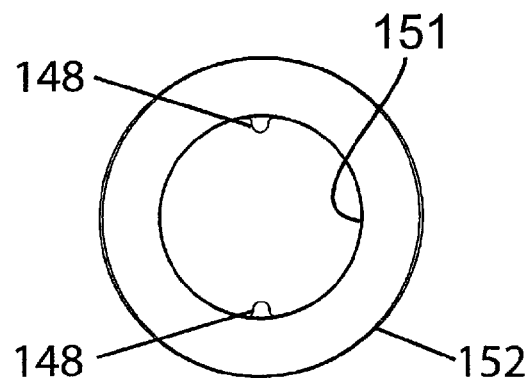
FIG. 15 is a top view of an illustrative example of a pipe fitting having alignment features.

The pipe fitting holder 136 is adapted to secure to one end of a pipe fitting 152, such as a fusible transition saddle, to be fused with the pipe. To achieve such functionality, the bottom end 142 contains an opening 144 that allows for coupling of the transition saddle, though for example, frictional fitting, snap fitting, or male/female couplings, see FIGS. 9B and 9C. Preferably, the opening 144 contains a plurality of channels 146 sized and shaped to engage and secure to plurality of securing members, illustrated as alignment rails 148 positioned within the interior 151 of a fusible pipe fitting 152, see FIG. 15. In this manner, the shape of the fitting holder 136 and the specific fusible fitting 152 provide a self-aligning mechanism. The fusible fitting 152 is simply snapped into place so that the channels 146 align with and receive the longitudinal members 148. Using this method, proper placement and securement is accomplished without the need for additional securing knobs, other adjustment knobs, or secondary mechanical closure devices.

A second plate 150 is fixed at the proximal ends 152 and 154 of rods 130 and 132 through a securing member, such as a screw 156. The second plate 150 contains an opening 158, preferably having a key-hole configuration, which is sized and shaped to provide at least a portion of a knob 160 to fit within. The knob 160 is coupled to a first end 162 of a shaft 164. A second end 166 of the shaft 164 couples to the pipe fitting holder 136. Engaging the knob 160 provides a compression mechanism to apply a compression force to the fitting during the heating process, as well as the fusion process. The shaft 164 preferably contains a spring 166 having a fixed tension to provide a predetermined compression rate. Having a preset compression rate allows the user to maintain proper tension on the fitting when the fitting is being heated and fused to the pipe. To achieve such functionality, one or more locking mechanisms are employed, see FIG. 11. A first locking mechanism, used in the heating process, includes heating lugs or tabs, 168 and 169, sized, shaped, and positioned to engage the key-hole opening 158. A second locking mechanism includes a plurality of fusion lugs or tabs 170 and 172 which are also sized, shaped, and positioned to engage the key-hole opening 158.

A heater assembly 174 is designed to be securable to the pipe fitting holder 136 at a first end and to the main fusion body 120 at a second end. This heater assembly is preferably inserted into and removed from the device 100 depending on the need of the user. The heater assembly includes a heater housing unit 176 sized and shaped to contain one or more heating elements within, such as the heating elements 52 and 54 and corresponding wiring 49 as described previously. As shown in FIG. 8, the heater housing unit 176 contains a curved upper surface 178. The curvature of the upper surface 178 is the same as, or substantially similar as the curvature or circumference of the end of the pipe fitting which will be fused to the existing pipe surface. In this manner, the entire surface of the pipe fitting remains in contact with the heating unit 176 during the heating process. The bottom portion of the heating unit 176 may contain an element that is sized and shaped to have a curvature that matches the curvature of the outer surface of the pipe. Such feature is similar to the element 41 as described previously. The heater assembly 174 further includes a handle 180. A first set of heat assembly securing members is illustrated as a pair of finger-like extensions 182 and 184 coupled to the heating assembly and arranged in a generally parallel manner. The finger-like extensions 182 and 184 have hooked ends 186 and 188 to provide coupling to the pipe fitting holder 136. Use of the finger-like extensions 182 and 184 fixes the heater unit in place, preventing the heating unit from moving in all multiple axes. In addition, the heater assembly may contain second heat assembly securing members, illustrated as alignment tabs 187 located on the front and back, see FIG. 11. At least one of the surfaces of the heating unit can be adapted to provide serrations to the pipe fitting, the pipe, or combinations thereof.

In use, the pipe fitting installation device 100 is placed on a pipe. As described, the pipe fitting installation device 100 provides a design which allows for full engagement and capture of the pipe from the top without the need of additional parts being swung under and around the pipe. To secure the device 100 to the pipes, a force is applied to the lever arms 122 and 124 so that they are snapped outwardly. This action closes the lower jaws 116 and 118 onto the pipe. The closing of the jaws 116 and 118 provide sufficient force to compress the pipe upwardly into the underside 121 of the pipe fitting installation device 100. In this position, the device self locks through the over center lever system or toggle locking action mechanism.

In addition to providing sufficient enclosure, the pipe is re-rounded to a particular radius. Once the pipe is secured, a transition saddle having a proper radius is inserted into the pipe fitting holder 136, which self aligns and properly positions the inserted saddle using the features described above. The heater assembly 174 is inserted into the pipe fitting installation device 100. Proper alignment is accomplished using alignment tabs 187 positioned on the front and back of the heater assembly by sliding the tabs 187 into grooves positioned within the main fuser body 138. The user then engages knob 160 by applying a downward force. This action moves the knob 160 in a downward direction. In this position, the fitting holder 138 is captured by the finger like extensions 182 and 184. Such action captures the heating assembly 174, providing correct alignment and preventing the heater assembly 174 from moving.

The first set of locking members, heating lugs 168 and 169, engage the fixed plate 150 through the key-hole opening 158, through activating the compression mechanism, i.e. applying a force to the knob 160. Such action compresses the spring 164 to burn in the heater to the top surface of the pipe and the underside of the transition saddle. Once full contact has been made, the lugs 168 and 169 are disengaged and a soaking portion of the heating phase is initialed. This phase is performed without spring compression or pressure. After a predetermined time, the knob 160 is pulled in an upward motion. The heating assembly 174 is removed. The pipe fitting is dropped down onto the pipe through aperture 134. A second set of locking members, the fusion lugs or tabs 170 and 172 engage the fixed plate 150 through the key-hole opening 158. This engagement compresses the spring 164 and provides the proper amount of pressure to the transition saddle to complete fusing. After sufficient time to cool, the process is complete and the transition saddle is fused to the pipe. The outer surface of the pipe which is within the interior of fitting is drilled out or removed so that fluid can flow between the pipe and the fitting.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A portable assembly for securing a pipe fitting to a pipe comprising:
   a main body support structure having an aperture sized and shaped to receive a pipe fitting, said support structure further including a plurality of securing jaws attached to a bottom surface and positioned for over the top engagement with a pipe, said main body support structure further comprising a heat assembly receiving area sized and shaped to receive at least one portion of a heating assembly;
   a first clamping mechanism, said first clamping mechanism containing a first lever arm having a first pivoting connection to said main body support structure, and a second pivoting connection to a first securing jaw;
   a second clamping mechanism, said second clamping mechanism containing a second lever arm having a first pivoting connection to said main body support structure, and a second pivoting connection to a second securing jaws;
   a removable heating assembly adapted for concurrent heating of a plurality of surfaces comprising a heating housing unit having one or more heating elements therein and having at least one surface configured to contact a pipe fitting and at least one surface configured to contact a pipe, said heating assembly having a first securing mechanism for securing to said pipe fitting support plate and a second securing mechanism for securing to said main body support structure;
   an upper plate positioned above said main body;
   a pipe fitting support plate positioned in between said upper plate and said main body, said pipe fitting support plate slidably coupled to a pair of longitudinally extending rods;
   a pair of longitudinally extending rods coupled to said support structure at or near a terminal end and to said first upper plate along a second opposing end at a distance from said terminal end; and
   a compression mechanism adapted for applying a force comprising a shaft having a first end coupled to said pipe fitting support plate and a second end which extends through said upper plate, and a spring coupled to said shaft, said second end having a locking mechanism for maintaining a compression force on said pipe fitting support plate in at least a heating position and at least a fusing position.

2. The portable assembly for securing a pipe fitting to a pipe according to claim 1 wherein said first clamping mechanism and said second clamping mechanism are attached to said main body support structure at opposing ends.

3. The portable assembly for securing a pipe fitting to a pipe according to claim 1 wherein said first clamping mechanism and said second clamping mechanism are adapted to provide toggle locking action.

4. The portable assembly for securing a pipe fitting to a pipe according to claim 1 wherein said compression mechanism further contains a knob coupled to said shaft, said shaft.

5. The portable assembly for securing a pipe fitting to a pipe according to claim 1 wherein said pipe fitting support plate is adapted to self align with a pipe fitting.

6. The portable assembly for securing a pipe fitting to a pipe according to claim 5 wherein said pipe fitting is a fusible transition saddle.

7. The portable assembly for securing a pipe fitting to a pipe according to claim 5 wherein said pipe fitting support plate contains at least one channel constructed and arraigned to receive at least one longitudinal member associated with said pipe fitting.

8. The portable assembly for securing a pipe fitting to a pipe according to claim 5 wherein said pipe fitting support plate contains an opening sized and shaped to receive a pipe fitting, said opening further containing at least one self alignment member configured to engage with a pipe fitting self aligning member.

9. The portable assembly for securing a pipe fitting to a pipe according to claim 8 wherein said at least one self alignment member is a channel sized and shaped to engage with a with a pipe fitting self aligning member.

10. The portable assembly for securing a pipe fitting to a pipe according to claim 1 wherein said first securing mechanism of said heating assembly contains two securing members for maintaining said heating assembly in the proper orientation relative to said pipe fitting support plate.

11. The portable assembly for securing a pipe fitting to a pipe according to claim 10 wherein said securing members for maintaining said heating assembly in the proper orientation relative to said pipe fitting support plate includes a plurality of finger-like extensions, each said finger like extension terminating in hook sized and shaped to engage with said pipe fitting support plate.

12. The portable assembly for securing a pipe fitting to a pipe according to 11 wherein said second securing mechanism of said second heat assembly securing member includes a first alignment tab positioned on the front of said heating assembly and a second alignment tab positioned on the back of said heating assembly.

13. The portable assembly for securing a pipe fitting to a pipe according to claim 1 wherein said first set of locking elements for maintaining a compression force to an inserted pipe fitting during a heating process comprises a first pair of locking tabs.

14. The portable assembly for securing a pipe fitting to a pipe according to claim 13 wherein said a second set of locking elements for maintaining compression force said inserted pipe fitting and said pipe during a fusion process is a second pair of locking tabs, said second pair of locking tabs positioned at a distance from said first pair of locking tabs.

15. The portable assembly for securing a pipe fitting to a pipe according to claim 1 wherein said compression mechanism includes a swing latch coupled to said shaft.

16. The portable assembly for securing a pipe fitting to a pipe according to claim 1 wherein said main body support structure further includes at least two heat assembly receiving areas sized and shaped to receive said second securing mechanism of said heat assembly.

17. The portable assembly for securing a pipe fitting to a pipe according to claim 16 wherein said heat assembly receiving area is two opposing two channel regions.

18. The portable assembly for securing a pipe fitting to a pipe according to claim 1 wherein said upper plate comprises an opening shaped to mirror the shape of said first or second pair of locking elements, whereby said opening allows for passage therethrough of said first or second locking elements when said first or second locking elements are in one orientation and prevents passage therethrough of said first or second locking elements when said first or second locking elements are in a second orientation.

19. The portable assembly for securing a pipe fitting to a pipe according to claim 1 wherein least one of said plurality of surfaces of said heating unit housing is configured to provide serrations to a pipe fitting, a pipe, or combinations thereof.

* * * * *